Dec. 2, 1947. D. W. FENTRESS 2,431,743
APPARATUS FOR ELECTRICALLY WELDING SPIRAL TUBING
Filed Sept. 20, 1943 3 Sheets-Sheet 1
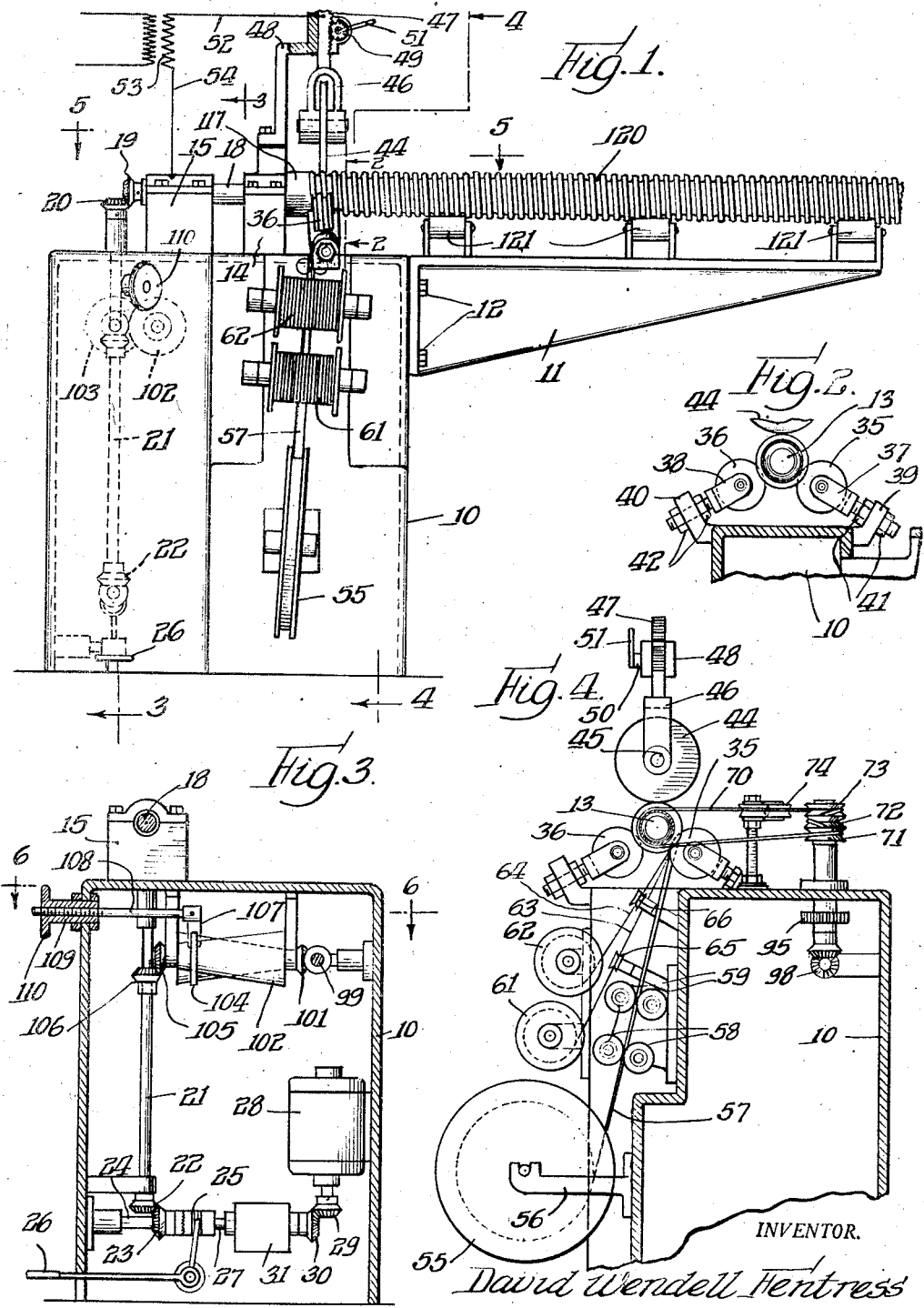
INVENTOR.
David Wendell Fentress
By: Loftus, Moore, Olson & Trexler
Attys.

Dec. 2, 1947. D. W. FENTRESS 2,431,743
APPARATUS FOR ELECTRICALLY WELDING SPIRAL TUBING
Filed Sept. 20, 1943 3 Sheets-Sheet 2
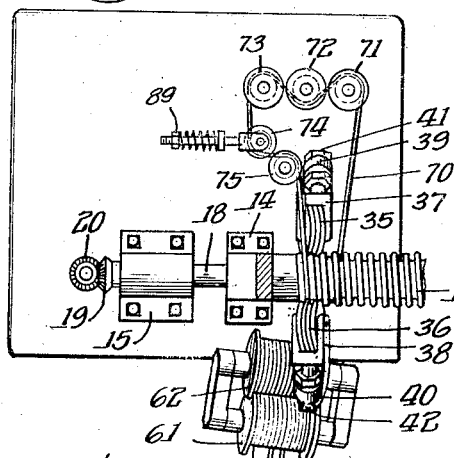
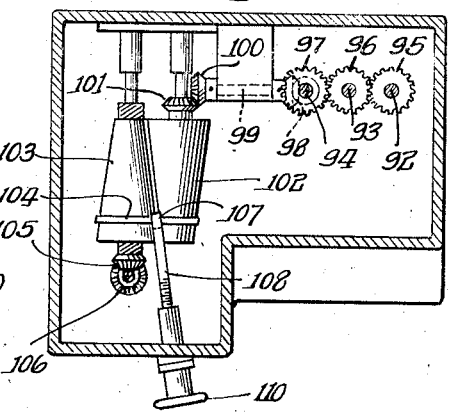
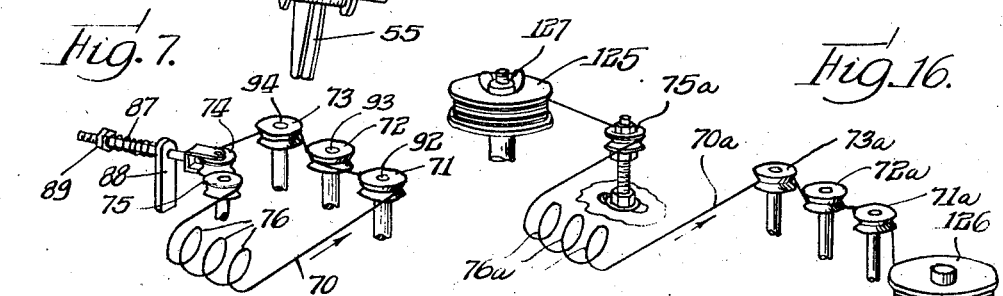
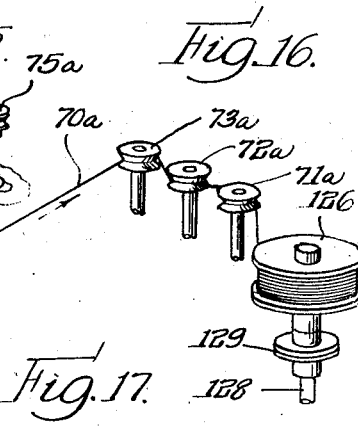
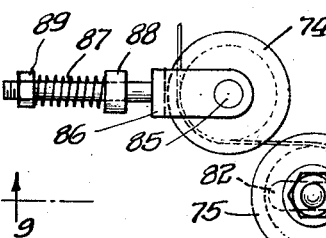
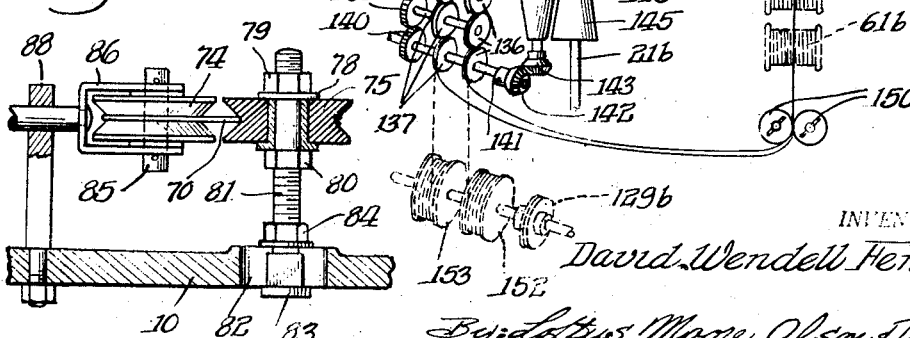
INVENTOR.
David Wendell Fentress
By: Loftus, Moore, Olson & Trexler
Attys.

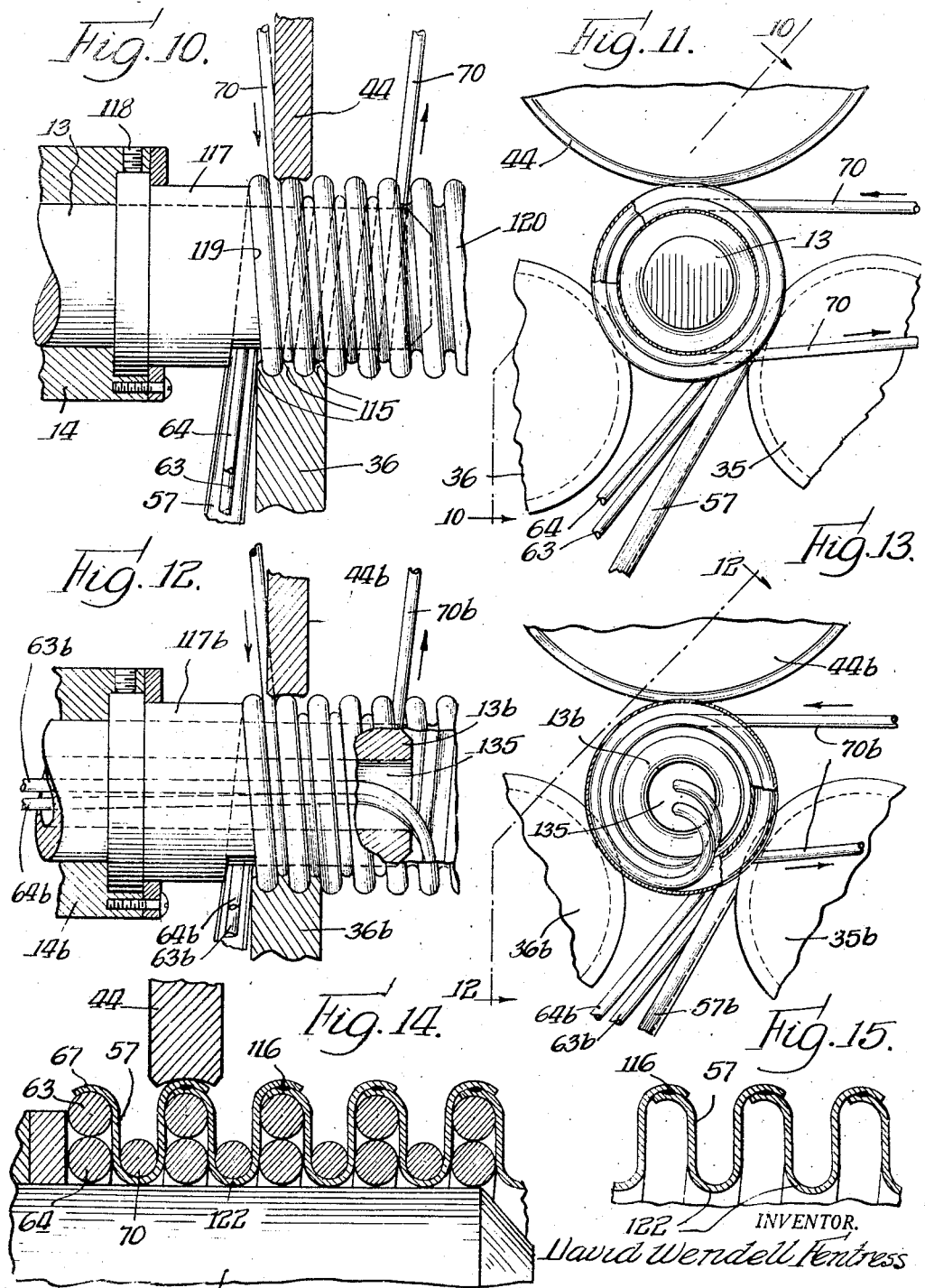

Patented Dec. 2, 1947

2,431,743

UNITED STATES PATENT OFFICE 2,431,743

APPARATUS FOR ELECTRICALLY WELDING SPIRAL TUBING

David Wendell Fentress, Barrington, Ill., assignor to Chicago Metal Hose Corporation, Maywood, Ill., a corporation of Illinois Application September 20, 1943, Serial No. 503,047

6 Claims. (Cl. 219—6)

This invention relates to apparatus for making flexible metal tubing, particularly of the welded, helical strip type.

It is an object of the invention to provide improved apparatus for making flexible metal tubing of the type stated, and to provide means both to facilitate the tube forming operations, and to improve the tube made, in its characteristics and qualities.

More specifically, one of the objects of the invention is to provide, in a helical strip type tube forming machine, improved means for feeding the strip through the machine and through the tube forming mechanism.

Another object of the invention is to provide, in a machine of the type stated, an improved mandrel structure.

Still further objects of the invention are to provide, in a machine of the type stated, means for facilitating the placement and operation of the electrode elements, means to facilitate the tube welding in a continuous and automatic manner, and means for improving the characteristics and qualities of the convolutions of the tubing produced.

Various other objects, advantages and features of the invention will be apparent from the following specification when taken in connection with the accompanying drawings, wherein certain preferred embodiments of the invention are set forth for purposes of illustration.

In the drawings, wherein like reference numerals refer to like parts throughout:

Fig. 1 is a general assembly view of a tube forming machine constructed in accordance with and incorporating certain of the principles of the invention;

Fig. 2 is a detail view of the guide roller mounting as embodied in the machine of Fig. 1, taken on line 2—2;

Fig. 3 is a transverse sectional view of the machine of Fig. 1, taken as indicated by the line 3—3 thereof;

Fig. 4 is a transverse sectional view of the machine of Fig. 1, taken as indicated by the line 4—4 thereof;

Fig. 5 is a horizontal sectional view of the machine, taken as indicated by the line 5—5 of Fig. 1;

Fig. 6 is a horizontal sectional view of the machine, taken as indicated by the line 6—6 of Fig. 3;

Fig. 7 is an illustrative view, diagrammatic in form, showing the manner in which the tube or strip propelling member is disposed in the machine;

Figs. 8 and 9 are detail views, on an enlarged scale, showing certain of the guide rollers for the strip propelling member, Fig. 9 being taken as indicated by the line 9—9 of Fig. 8;

Fig. 10 is a detail view, on an enlarged scale, of the mandrel structure, and associated parts at the welding or tube forming station, and taken as indicated by the line 10—10 of Fig. 11;

Fig. 11 is an end view of the structure of Fig. 10;

Fig. 12 is a view similar to Fig. 10, but showing a modified form of mandrel structure, and taken as indicated by the line 12—12 of Fig. 13;

Fig. 13 is an end view of the structure of Fig. 12;

Figs. 14 and 15 are detail illustrative views, on a further enlarged scale, showing the manner in which the tubing is formed;

Fig. 16 is an illustrative view, diagrammatic in form, showing a modified arrangement for the tube or strip propelling member; and Fig. 17 is an illustrative view also diagrammatic in form showing selective arrangements for the electrode wires, as utilized with the mandrel structure of Figs. 12 and 13.

This invention relates primarily to the type of machine illustrated in the patent to Albert Dreyer No. 2,314,611, dated March 23, 1943, constituting an improvement thereon. It is to be understood, however, that various features of the invention also have more general utility. For example, the tube or strip propelling means, hereinafter to be described, may be adapted for use with various forms of machines for making flexible tubing from helically wound metal strip, whether the strip is welded or otherwise secured along the juxtaposed strip edges.

Referring more specifically to the drawings, and first to the embodiment illustrated in Figs. 1 to 11 inclusive, it will be seen that the machine shown comprises a main frame 10, to which an auxiliary frame or extension 11 is secured by suitable means such as bolts 12. The main frame carries a rotatable mandrel 13, best shown in Figs. 4, 10 and 11, upon which the tube forming operations are adapted to be performed. The mandrel is rotatably journalled in a pair of bearings or pillow blocks 14 and 15, Fig. 1, which are mounted on the uppermost table surface of the main frame.

Means is provided for rotatably driving the mandrel under the control of the operator. As illustrated in Figs. 1 and 3, it will be seen that the mandrel is fixed to a horizontal drive shaft 18, the end of which carries a bevel gear 19 adapted to mesh with a bevel gear 20 driven by a vertically disposed drive shaft 21. The lower end of this vertical drive shaft in turn carries a bevel gear 22 adapted to mesh with a bevel gear 23 fixed to a drive shaft 24. A clutch 25 under control of a bell-crank foot control lever 26 is adapted when engaged to connect the drive shaft 24 with a coaxially disposed drive shaft 27, the latter being adapted to be driven from an electric motor 28, bevel gearing 29 and 30 and speed reducer 31. The electric motor 28 is preferably constantly driven during the operation of the machine, and it will be seen that as the clutch 25 is engaged and disengaged by means of the foot pedal 26, the mandrel 13 will be selectively driven at a speed determined by the speed reducer 31. This speed reducer may be of any suitable standard construction, preferably comprising suitable reduction gears.

A pair of guide rollers 35 and 36, Figs. 1, 2, 4 and 11, are provided in juxtaposition to the mandrel 13, and cooperate therewith in the tube forming operations. These guide rollers, as best shown in Figs. 1 and 2, are mounted on shafts carried, respectively, in yoke brackets 37 and 38. The ends of the brackets are screw threaded and extend through openings provided in a pair of pedestals 39 and 40 mounted on the frame 10, being adjustably held therein by pairs of nuts 41 and 42. It will be seen that by adjustment of the nuts, the yoke brackets 37 and 38 may be both axially and rotatably adjustably positioned. In the particular embodiment illustrated the guide rollers 35 and 36 are not driven, being caused to rotate by reason of their engagement with the tubing strip on the mandrel, as will later more clearly appear. It is to be understood, however, that driving means for the rollers may be provided if desired, for driving them in timed relation with and at the peripheral speed of the mandrel 13.

A welding roller 44, Figs. 1, 4, 10 and 11, is also provided in juxtaposition to the mandrel for co-operation therewith. The welding roller may also be rotatably driven in timed relation with the mandrel, if desired, but in the particular embodiment illustrated, the welding roller is shown as being non-powered and is adapted to be rotated by reason of its contact with the tube strip during the welding operations, as will later appear. More specifically, the welding roller is journalled upon an axle or shaft 45 carried at the lower bifurcated end of a fork or yoke member 46, somewhat similar to the yoke members 37 and 38 previously described. The upper end 47 of the yoke member is reciprocably mounted within a bracket 48 carried by the bearing 14. This portion 47 of the yoke member is formed with rack teeth adapted to have geared engagement with the gear 49 pinned to a shaft 50 journalled in the bracket 48. This shaft is provided with a control handle 51 on its end. It will be seen that by manipulation of the handle 51, the vertical positioning of the yoke member 46 and the electrode roller 44 may be controlled. As will be understood, the welding current may be supplied to the electrode roller by connection to one of the leads 52 of the secondary of a suitable welding transformer, diagrammatically indicated at 53, Fig. 1, the welding roller and the associated bracket structures to this end being suitably insulated from the remainder of the machine. The other lead 54 of the secondary of the transformer is adapted for electrical connection with the mandrel 13, through the intermediary of the bearing 15 and the shaft 18, these parts also being suitably insulated for this purpose, as will be understood.

A supply roll 55, Figs. 1 and 4, of strip stock from which the tubing is adapted to be formed, is mounted on the main frame of the machine by means of a suitable bracket structure as indicated at 56. The strip stock 57 carried by the roll 55, is in the form of an elongated, relatively thin, flat metal strip, of which the tubing is to be formed. Suitable profiling rollers are provided, as indicated at 58 and 59, Fig. 4, these profiling rollers being so shaped that as the strip is drawn therethrough during the operation of the machine, a general U-shaped profiling is imparted thereto, as best shown in Figs. 14 and 15.

The main frame of the machine also carries a pair of supply rolls 61 and 62 for supplying electrode wires 63 and 64 to the machine. These electrode wires are copper wires of the character and for the purpose described in the aforementioned patent to Albert Dreyer No. 2,314,611, it being understood that various numbers of wires, having various cross sectional shapes, may be provided as therein described. In the particular embodiment here shown, two wires, of conventional round shape in cross section are illustrated. Pairs of cooperating guide rollers 65 and 66 are provided for guiding the electrode wires to the mandrel and the tube forming station.

The manner in which the electrode wires and the tube strip are interengaged at the welding station is best illustrated in Figs. 4, 10, 11 and 14. It will be seen that the two wires 63 and 64 are brought into superposed relation and arranged beneath one of the turned flanges 67, Fig. 14, of the profiled tube strip.

In accordance with the invention means is provided for aiding the mandrel in the feeding of the tubing strip 57 through the machine, thereby insuring that the tubing strip will be properly fed as the mandrel rotates, and the welding operations properly performed. The feeding means also aids in alining the parts at the welding station, and insuring the formation of proper contours in the convolutions of the tubing. More specifically, an elongated feeding or propelling member 70, Figs. 4, 5, 7, 10 and 11, is provided, which propelling member is wrapped helically around the tubing strip to effect a gripping thereof, and at the same time positively driven longitudinally to effect the feeding operations. Referring to Figs. 4, 5 and 7, it will be seen that the member 70 is propelled by a set of driving rolls 71, 72 and 73, three such driving rolls being provided in the particular embodiment illustrated, and also passes over and is guided by a pair of idler rolls 74 and 75. In the particular embodiment shown, the driving member has three turns 76 around the tubing or tubing strip.

The details of the idler rolls 74 and 75, and their associated structures, are shown in Figs. 8 and 9. The idler roll 75 which guides the feeding member onto the tubing strip is preferably adjustable both vertically and laterally to facilitate the guiding of the feeding member into proper position upon the strip. As shown, the roller 75 is rotatably mounted on a sleeve or thimble 78 adapted to be clamped between a pair of nuts 79 and 80 threadedly mounted upon an upstanding bolt 81. By adjusting the nuts 79 and 80 longitudinally of the bolt, it will be seen that the thimble 78 and the roller 75 may be vertically adjusted to any desired position.

To effect lateral adjustment, the frame is provided with a slot 82 through which the bolt 81 extends, the bolt being adapted to be adjustably clamped within the slot by means of its head 83 and an adjustment nut 84.

The idler roller 74 is carried by shaft 85 rotatably mounted in a yoke 86, which yoke is adjustably urged in a direction to pull upon the member 70 by means of a compression spring 87 disposed between a support post and an adjustment nut 89 threadedly mounted on the yoke shaft. Due to the tension of the spring 87, the idler roll 74 maintains the feeding member 70 under a predetermined tension at all times, thus causing the convolutions 76 of the feeding member to maintain frictional gripping engagement with the tubing strip, and also to cause the feeding member to maintain frictional gripping contact with its several driving rollers, 71, 72, 73.

Means is provided for driving the drive rollers 71, 72 and 73 in predetermined timed relation to the mandrel at all times during mandrel rotation. More specifically, as best shown in Figs. 3, 4 and 6, the several shafts 92, 93 and 94 upon which the driving rollers are mounted carry intermeshing gears 95, 96 and 97, the shaft 92 also carrying a gear adapted to have meshing engagement with a bevel gear 98 connected to a drive shaft 99. This drive shaft is provided at its other end with a bevel gear 100 adapted to have meshing engagement with a bevel gear 101 secured to a driven cone member 102. A driving cone 103 is provided in juxtaposition to the cone 102, a longitudinally adjustable belt 104 being provided for connecting the cones in driving relation, as will be understood. The cone 103 is driven by means of a bevel gear 105 meshing with a bevel gear 106 fixed to the main vertical drive shaft 21 of the machine. It will be seen that as the shaft 21 operates to drive the mandrel 13, it also operates by means of the connections described to rotate the several drive rollers 71, 72 and 73 for the feeding member 70.

The speed ratio of the driving engagement between the cones 102 and 103 may be adjusted by the shifting of the belt 104. Such shifting of the belt, longitudinally of the cones, may be effected by means of a yoke member 107 secured to a shaft 108 and adapted to be longitudinally shifted with respect to the machine frame 10 by means of a rotatable adjustment collar 109 with which it has threaded engagement. The collar 109 is provided with a handle portion 110 by means of which it may be readily operated. In the particular embodiment disclosed, it will be seen that adjustment of the collar 109 effects adjustment of the speed of the driving member 70 with respect to the speed of mandrel rotation, through the intermediary of the variable speed drive 102, 103, 104. It is to be understood, however, that in certain instances it may be preferred to gear the drive rollers 71, 72, 73 for the drive member 70 directly to the drive shaft 21, thereby positively interconnecting the drive rollers and the mandrel 13. In the particular embodiment illustrated, three connected drive rollers 71, 72 and 73 are illustrated, the feeding member 70 being engaged therearound to increase the frictional gripping contact. The number of drive rollers may be increased, if desired, to increase the frictional gripping contact with the feeding member in any particular installation.

The strip propelling or feeding member 70 may be constructed of various materials, such as metal, plastic, rawhide, et cetera, and may comprise a wire, chain, rope, or a cord, in accordance with the requirements of any particular installation. The feeding member must have adequate tensile strength, and be sufficiently flexible to be guided around the tubing convolutions and over the several driving and idler guide rollers.

In operation, as the mandrel 13 and the feeding member 70 are driven, the tube strip 57 will be drawn from the supply roll 55, through the profiling rollers 58 and 59, by which it is profiled and wrapped around the mandrel, the juxtaposed strip edges being brought into overlapping relation, as shown in Fig. 14. Simultaneously the electrode wires 63 and 64 are drawn from the supply rolls 61 and 62 and brought into superposed relation underneath the superposed strip edges, as shown in Fig. 14. The guide rolls 35 and 36, positioned to conform with the helical disposition of the convolutions, carry a series of annular ribs or ridges 115, Fig. 10, for guiding the profiled strip, these ridges being shaped to conform to the external contours of the tubing and to the driving member 70. As the superposed strip edges come into engagement with the welding roller 44 they are welded as indicated at 116, Fig. 14, the welding current passing from the welding roller into the electrode wires 63 and 64 during the welding operation. The electrode wires also absorb the mechanical compression of the welding roller during the welding operation.

A push-off bushing 117, Fig. 10, secured to the bearing pedestal 14 by means of a set screw 118 loosely embraces the mandrel 13, and is provided with a helical end surface 119 for projecting the tubing strip axially off of the mandrel as the tubing is formed. The completed tubing, indicated by the reference numeral 120 in Fig. 1, is continuously axially and rotatably projected from the machine, and is guided therefrom by a series of guide rollers 121 carried by the auxiliary or extension frame 11.

The convolutions 76 of the elongated feeding member 70 grip the tubing strip during the welding operations, insuring that the strip will be properly fed through the machine. The feeding member 70 also acts as a positioning or guiding device for insuring the proper placement of the electrode wires 63 and 64 within the contours of the tubing strip, and for insuring the proper overlapping engagement with the welding roller 44. Still further, the feeding member 70 engages in the trough portions 122 of the tubing strip, preventing collapse of these trough portions during the tube forming operations and also insuring that a smooth contour will be provided in the tubing trough portions, as will be best understood by reference to the finished tubing as shown in Fig. 15. As previously stated, if desired, the guide rollers 35 and 36 and the welding roller 44 may also be power driven with the mandrel, whereby to aid the feeding member 70 in its feeding functions if desired.

In the previously described embodiment, the feeding member 70 is illustrated as an endless elongated cord, wire or chain as the case may be. In Fig. 16 an alternate or modified arrangement is disclosed wherein the feeding member, indicated by the numeral 70a, during operation of the machine, is withdrawn from a supply roll 125 and transmitted to a take-up roll 126, being caused to make but a single pass through the machine. In this instance a guide roller 75a, similar in function and purpose to the guide roller 75 previously described, is provided for guiding the feeding member onto the tubing strip, and a series of guide rollers 71a, 72a and 73a, similar to the rollers 71, 72 and 73 previously described are provided for driving the feeding member from the supply roll 125 to the take-up roll 126. Suitable friction means, adjustable by means of a wing nut 127 are associated with the supply roll 125, thus insuring a predetermined tension within the feeding member, for the purpose described in connection with the roller 74 and associated tension spring 87 in the previously described embodiment. The take-up roll or reel 126 is adapted to be driven from a shaft 128 by means of a slip friction clutch 129, whereby to withdraw the feeding member from the drive rollers 71a, 72a and 73a onto the take-up reel. As will be understood, the shaft 128 will be driven at sufficient speed so that take-up tension is maintained in the feeding member 70a when the diameter of the take-up roll is at a minimum, the friction clutch 129 thereafter slipping as the size of the roll builds up. The speed of rotation of the take-up roll 126 accordingly will be variable, in accordance with the size of the take-up roll, whereas the speed of rotation of the drive rollers 71a, 72a and 73a remains constant and in direct proportion to the speed of rotation of the mandrel. It is believed that the operation of the structure illustrated in Fig. 16 will be clear from what has been said with respect to the previously described embodiment.

In the previously described embodiments, the electrode wires 63 and 64 remain in the convolutions of the tubing as it is formed, to be thereafter left in the tubing or removed if desired after the tubing has been removed from the machine. In Figs. 12, 13 and 17 an embodiment is illustrated wherein the electrode wires may be continuously removed from the tubing convolutions, after the welding operation and as the tubing is formed. In this instance the mandrel, indicated by the numeral 13b, Fig. 12, is in the form of a shell having a central opening 135 through which the electrode wires, indicated at 63b and 64b, are continuously withdrawn during the operation of the machine. The mandrel structure is otherwise of the form set forth in reference to the previously described embodiments.

In order to remove the electrode wires through the hollow mandrel two sets of drive rolls 136 and 137 for the respective electrode wires are provided, Fig. 17, these drive rolls being driven by gears 138, 139 and 140, as shown. The drive rolls 136 and the drive rolls 137 are in this instance in contacting engagement with each other so as to effect a positive gripping and driving action upon the electrode wires, the wires not being under tension as in the case of the feeding member 70 or 70a previously described.

To effect the powering of the driving rolls, the shaft 141 upon which the lower driving rolls are mounted is provided on its end with a bevel gear 142 meshing with a bevel gear 143 driven from a pair of cones 144, 145 and associated adjustable belt connection 146. The cone drive structure 144—146 is similar to the structure 102—104, Fig. 6, previously described, and it will be understood that suitable means will be provided for adjusting the belt 146 to provide a variable drive connection. It will also be understood that any suitable variable drive transmission is contemplated for either withdrawing the electrode wires or for the feeding member 70, and may be used, for example change speed cone gears or the like in instances where a more positive driving connection is desired. The cone 145 may be mounted upon and driven by the main vertical drive shaft of the machine 21b. The drive rolls 136 and 137 will be driven at a speed so as to cause the electrode wires to be loosely withdrawn through the hollow mandrel from the end thereof, as indicated in Fig. 12, as the mandrel rotates.

In Fig. 17 a continuous or endless arrangement for the electrode wires is indicated in solid lines, and a single pass supply roll and take-up roll arrangement is indicated in dotted lines. More specifically, referring to the solid lines, the electrode wires are transmitted from the drive rolls 136 and 137 to a pair of friction rolls 150 provided with suitable adjustable friction means for resisting their rotation, the electrode wires passing between these friction rolls and thence between guide rolls 151 onto the machine mandrel structure. It will be seen that in this arrangement the electrode wires are endless in character and may be continuously used. Alternately, as indicated in dotted lines, the electrode wires may be transmitted from the drive rolls 136 and 137 to a pair of take-up rolls 152 and 153, similar to the take-up roll or reel 126 previously described in reference to Fig. 16, and suitably driven through a similar friction clutch arrangement as indicated at 129b. The electrode wire is supplied to the mandrel for the tube forming process from supply rolls 61b and 62b, as in the case of the embodiment first described.

It is obvious that various changes may be made in the specific embodiments set forth for purposes of illustration without departing from the spirit of the invention. The invention is accordingly not to be limited to the specific embodiments shown, but only as indicated in the following claims.

The invention is hereby claimed as follows:

1. A tube making machine comprising a rotatable mandrel, means for winding an elongated strip helically upon the mandrel to bring the strip edges into juxtaposed relation, means for welding the juxtaposed strip edges together whereby to form a welded tubing structure, said welding means comprising a welding roller engageable exteriorly of the tubing strip and an elongated electrode wire adapted to be interposed between the tubing strip and the mandrel, said mandrel comprising a hollow cylindrical shell, and means for propelling said electrode wire through the hollow mandrel during the welding and tube forming operations.

2. A tube making machine as defined in claim 1, wherein said electrode wire comprises an endless band.

3. A tube making machine as defined in claim 1, wherein supply and take-up wheels are provided for feeding said electrode wire through the machine.

4. A tube making machine comprising a rotatable mandrel having an axial passage therethrough, means for winding an elongated metal strip helically upon the mandrel to bring the edges of the strip into juxtaposed position, means for welding the juxtaposed edges of the strip to completely form the tubing structure on said mandrel and said means including a rotatable electrode roller adapted to engage the tubing strip exteriorly thereof and an elongated electrode wire interposed helically between the strip and the mandrel, and means for continuously feeding the electrode wire into position between the strip and the mandrel and for withdrawing the electrode wire from the welded tubing structure and through said passage after feeding of the completed tubing structure beyond the free end of the mandrel.

5. A tube making machine comprising a mandrel having a passageway therein, means for winding an elongated metal strip helically upon the mandrel to bring the edges of the strip into juxtaposed position, means for welding the juxtaposed edges of the strip to completely form the tubing structure on said mandrel and said means including a rotatable electrode roller adapted to engage the tubing strip exteriorly thereof and an elongated electrode wire interposed helically between the strip and the mandrel, and means for continuously feeding the electrode wire into position between the strip and the mandrel and for withdrawing the electrode wire from within the welded tubing structure beyond the welding station and through said passageway.

6. Apparatus for making profiled tubing having inwardly and outwardly opening convolutions and comprising a mandrel, means for winding an elongated profiled strip helically on said mandrel with the strip edges in juxtaposed position, means including a device engageable with the outer extremity of the inwardly opening convolutions of the strip for securing together the juxtaposed edges thereof, and means for feeding the strip axially of said mandrel and including an elongated driven flexible member wound exteriorly and completely around the strip and disposed within the outwardly opening convolutions thereof, said member having a uniform cross section sufficient to continuously and snugly engage within the troughs of the outwardly opening convolutions and along at least portions of the walls thereof and having immediately adjacent portions thereof disposed on opposite sides of the means for securing together the juxtaposed edges of the strip whereby to laterally support the inwardly opening convolutions of the strip during the tube forming operation.

DAVID WENDELL FENTRESS.

REFERENCES CITED

The following references are of record in the file of this patent:

UNITED STATES PATENTS

| Number | Name | Date |
| --- | --- | --- |
| 1,018,291 | Beadle | Feb. 20, 1912 |
| 1,878,376 | Cammen | Sept. 20, 1932 |
| 2,314,611 | Dreyer | Mar. 23, 1943 |
| 183,327 | Root | Oct. 17, 1876 |
| 183,328 | Root | Oct. 17, 1876 |
| 1,939,581 | Tesmer | Dec. 12, 1933 |
| 1,793,281 | Freeze | Feb. 17, 1931 |
| 1,793,282 | Freeze | Feb. 17, 1931 |
| 1,795,380 | Stresau | Mar. 10, 1931 |
| 1,832,059 | Stresau | Nov. 17, 1931 |